US005745590A

United States Patent [19]

Pollard

[11] Patent Number: 5,745,590

[45] Date of Patent: Apr. 28, 1998

[54] CLOSED LOOP MAIL PIECE PROCESSING METHOD

[75] Inventor: Larry C. Pollard, Denver, Colo.

[73] Assignee: U S West, Inc., Englewood, Colo.

[21] Appl. No.: 694,132

[22] Filed: Aug. 8, 1996

[51] Int. Cl.$^6$ .................... G06K 9/00

[52] U.S. Cl. .................. 382/101; 364/478.09; 270/52.02

[58] Field of Search .................. 382/101, 112, 382/317; 705/410; 364/478.08, 478.09, 478.1, 478.15; 209/583, 584; 270/52.02, 52.04, 52.05

[56] References Cited

U.S. PATENT DOCUMENTS

| | | | |
|---|---|---|---|
| 4,576,370 | 3/1986 | Jackson | 270/54 |
| 5,067,088 | 11/1991 | Schneiderhan | 364/478 |
| 5,317,654 | 5/1994 | Perry et al. | 382/61 |
| 5,413,321 | 5/1995 | Banks et al. | 270/58 |
| 5,510,997 | 4/1996 | Hines et al. | 364/478 |

*Primary Examiner*—Andrew W. Johns
*Attorney, Agent, or Firm*—Brooks & Kushman

[57] ABSTRACT

A method for generating a plurality of mail pieces including error detection and reprinting capabilities. The method provides a mail handling process which tracks processing errors with the use of a first and second scan code which obtain information regarding each mail piece, diverts mail pieces in response to an error detection, transmits such errors to a processor, and automatically generates a reconfigured print file to initiate reprints for the diverted mail pieces.

3 Claims, 3 Drawing Sheets

CLOSED LOOP MAIL PIECE PROCESSING METHOD

TECHNICAL FIELD

This invention relates to a method for detecting and tracking mail handling errors and providing an automated response for reprinting.

BACKGROUND ART

Mass mailings have become common in today's society. Political, charitable, and business organizations rely on such mass mailings to communicate effectively with their target audience. Such large-scale mailings, however, are cost-intensive in terms of both postage and the labor required for their production. Efforts have thus been made to automate mail handling processes to more efficiently sort, collate, and prepare mail pieces for postage to reduce the associated labor costs. A leader in this field, Pitney-Bowes is in the business of designing machines which process and prepare mail pieces for postage.

Pitney-Bowes features machines which incorporate a series of operating stations that insert appropriate documents into a mail piece, with sensors built in throughout the process to detect errors and a postal meter through which completed mail pieces are processed. While these machines provide significant time savings from the days of hand-stuffing envelopes and hand-applying stamps, the associated technology has severe shortcomings. Namely, the printing and error detection functions are disconnected. As a result, reprinting a mail piece due to a detected error requires access to one or more error files as well as a complete reprogramming of the associated print files. As discussed herein, this process is both time consuming and expensive.

Consider, for example, the situation wherein an error condition is detected at one of the several operating stations. The mail pieces are serially processed first through a printing station and then through one or more of the operating stations which provide inserts. Once a mail piece is printed for insertion in an envelope, the printing station begins printing the next mail piece identified in the print file. No memory is kept, however, of previously printed files. Nor does the print file have access to or knowledge of mail pieces which, for one reason or another, are associated with an error condition. As a result, if the mail piece or its associated insert are detected as being inserted incorrectly, damaged, or merely improperly collated, the error and the diversion of the associated mail piece from the processing method are identified only in a corresponding error file which must be accessed at some later date to generate a new print file. Of course, if further errors are detected in the new print file, they must again be reprogrammed at a later date to ensure that the mail pieces associated with these errors are generated. As is readily seen, the time and expense required to continuously reprogram the print file to ensure full printing of the thousands of mail pieces being generated is extensive. Consequently, a need exists for a closed loop processing method wherein errors detected in the generated mail pieces are communicated to the print file which is automatically reconfigured to ensure that all mail pieces have been properly generated.

SUMMARY OF THE INVENTION

It is an object of the present invention to provide an error detection and mail piece reprinting method where each mail piece is tracked and errors are recorded for subsequent reprinting.

It is also an object of the present invention to provide a fully automated mailing method which detects errors in each mail piece, records all non-conforming pieces of mail and automatically reconfigures the associated print file for subsequent reprinting.

It is another object of the present invention to provide a means for ensuring that each mail piece is properly inserted into an envelope so that the postal address is readable.

It is yet another object of the present invention to provide a method which keeps track of the number and specific pages required in each mail piece and records any errors in that process.

In carrying out the above objects, the present invention discloses a method of generating a plurality of mail pieces, for use with a computer having a processor and memory. The mail pieces are generated in a predetermined order as specified in a print file. Each mail piece corresponds to a data file stored in the computer memory. Each data file has an identification field, including file number information identifying the file number, and an insert field, including insert information identifying the inserts to be included with the mail piece in an envelope.

The method includes a first step of generating each of the plurality of mail pieces in the order specified in the print file, each mail piece having a first scan code positioned at a first location on the mail piece and a second scan code positioned at a second location of the mail piece so that it is readable only when the mail piece is properly inserted in its envelope, the first scan code containing its file number information and insert information and the second scan code, containing its file number information.

The mail piece is then received at a first scanning station and the first scan code is scanned to determine its corresponding file number and associated inserts.

An insert station then receives each mail piece. At the insert station, each mail piece is inserted into its envelope with its corresponding inserts.

The second scan code of each mail piece is then scanned at a second scanning station. In response to the second scan code not being readable, the corresponding mail piece is diverted and an orientation error message is transmitted to the processor, the error message identifying the file number of the diverted mail piece. A determination is also made regarding whether the mail piece was received at the second scanning station in the proper sequence. In response to the second scanning station receiving the mail piece in the proper sequence, the mail piece is forwarded to a postage station. If the second scanning station does not receive the mail piece in the proper sequence, the mail piece is diverted and a sequence error message is generated for receipt by the processor.

The print files are then reconfigured to include only the corresponding data files of the diverted mail pieces, the reconfigured print file specifying a predetermined order for printing the mail pieces. Each of the above steps are then repeated until all mail pieces in the print file have been generated.

The objects, features and advantages of the present invention are readily apparent from the following detailed description of the best mode for carrying out the invention when taken in connection with the accompanying drawings.

BEST MODE FOR CARRYING OUT THE INVENTION

Figure 1A:
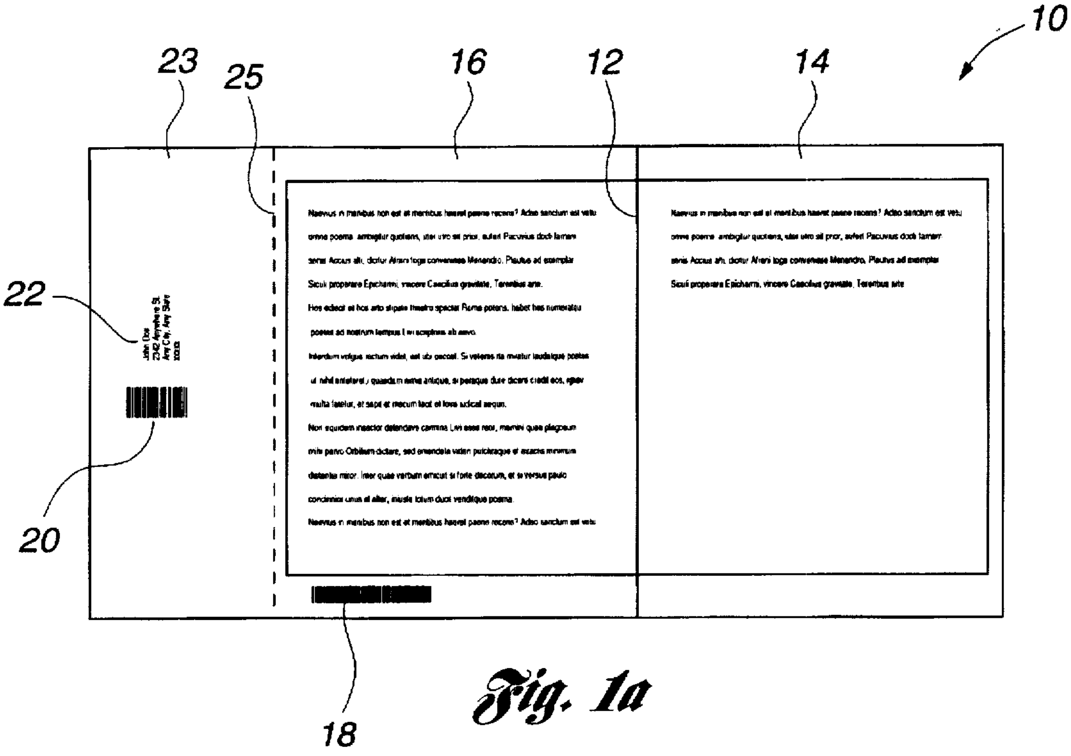
FIG. 1A is a schematic diagram of a mail piece generated in accordance with the processing method of the present invention.

Referring to FIG. 1, there is shown a schematic diagram of a mail piece 10 which is generated in accordance with the processing method of the present invention. Mail piece 10 is preferably, but not necessarily, generated as an envelope-ready, one-piece document which is foldable along a center axis 12 so to define two distinct text-readable faces 14 and 16. In keeping with the invention, a first scan code 18 comprising a bar code, or the like, is printed on the mail piece, either on face 14 or 16. The position of the first scan code should be adjusted to correspond with the location of the scanner and in particular the scanning mechanism of the processing system. In the preferred embodiment, the first scan code is positioned on face 16. A second scan code 20 similarly comprising a bar code, or the like, is printed in proximity to the intended recipient's postal address 22.

Figure 1B:
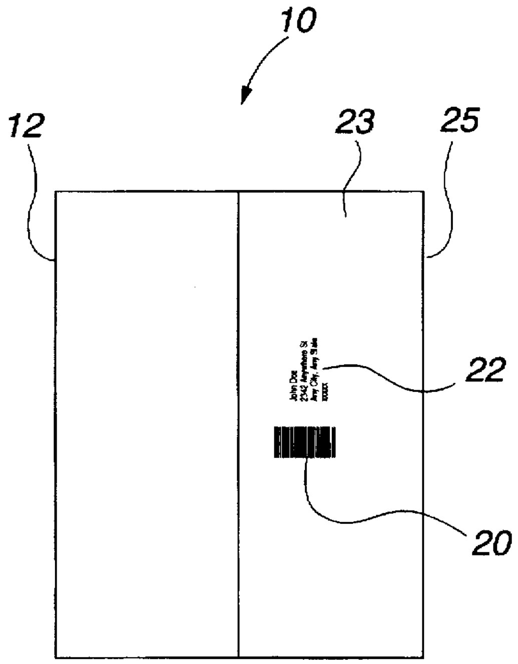
FIGS. 1B and 1C are a schematic diagram of the mail piece of FIG. 1A shown properly inserted in an envelope prior to postage.
Figure 1C:
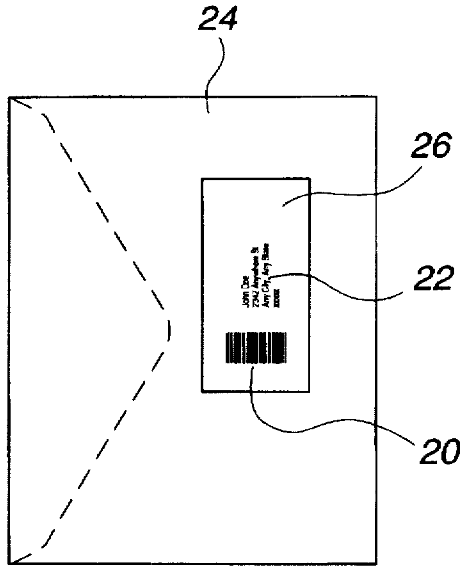

In the preferred embodiment, face 16 would include a tear piece 23. Accordingly, as depicted in FIG. 1, face 16 has a perforated fold line 25 parallel to the center axis 12 to create a tear piece 23, a piece of face 16 which can readily be detached by the recipient for remittance purposes. The tear piece 23 preferably has on one side the recipient's postal address 22 and the second scan code 20, as depicted in FIG. 1, and on the reverse side remittance information so that the recipient can detach the tear piece, and return the tear piece with the remittance information to the sender. In the preferred embodiment then, the recipient's postal address 22 and the second scan code 20 are positioned on the tear piece 23 so that when the mail piece is folded, faces 14 and 16 are folded together and the tear piece 23 is folded back at the perforated fold line 25, so as to be readable even after the mail piece is folded as shown in FIG. 1B. In this manner, when the mail piece is inserted in the envelope, the recipient's postal address will be readable therethrough.

In the preferred embodiment, the information on the tear piece 23 is oriented in a direction perpendicular to the direction of the rest of face 16 and face 14. This difference in orientation is to set apart the tear piece for remittance purposes and to facilitate postage. Accordingly, then the recipient's postal address 22 and the second scan code 20 are oriented perpendicular to the information provided on face 14 and the remaining piece of face 16.

Figure 3:
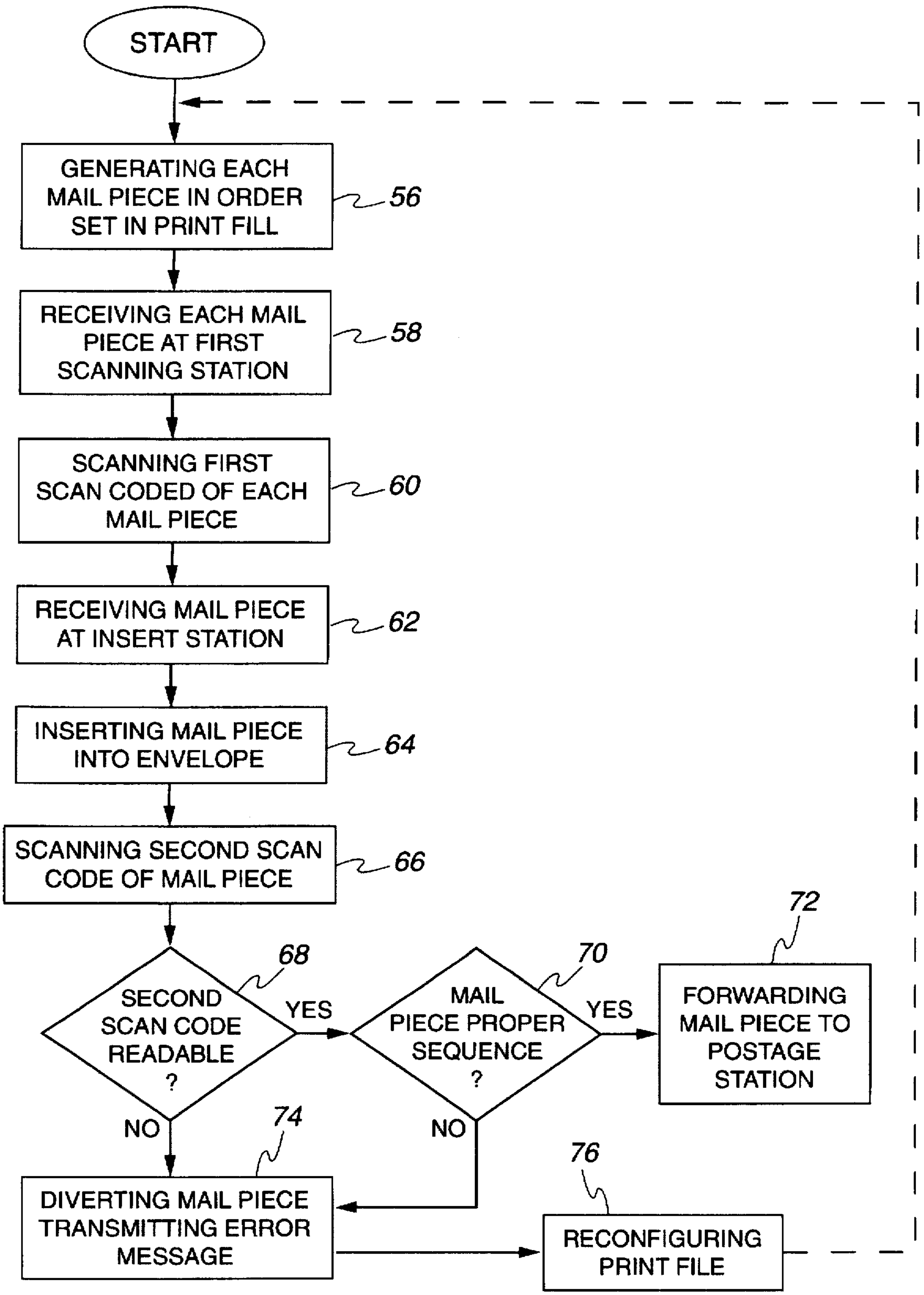
FIG. 3 is a flow diagram of a method for generating the mail piece of FIG. 1 in accordance with the teachings of the present invention.

Both the first and second scan codes 18 and 20, respectively, contain information in coded form which corresponds to a data file (not shown) stored in a computer memory 34 as shown in greater detail in FIG. 3.

In keeping with the invention, mail pieces are generated in a predetermined order as specified in a print file (not shown) which is similarly stored in computer memory 34. The predetermined order for the mail piece is derived from information contained in the aforementioned data files. As discussed in further detail herein, the print file communicates with each data file to obtain relevant information for each corresponding mail piece to be printed.

Each data file has an identification field, including file number information identifying the file number, and an insert field, including insert information identifying the inserts to be included with the mail piece in an envelope. Accordingly, the sequence of each mail piece is predetermined based on the file number of each mail piece as provided in the data file and specified in a print file. The insert information lists which inserts are to be associated with a specific mail piece. As an example, for telecommunication mailings, in addition to a monthly billing invoice, a mail piece may also include a newsletter informing customers of service updates, billing changes, and new products and services such as, for example, caller-ID, 3-way calling, etc.

Still referring to FIG. 1, scan code 18 is preferably, but not necessarily, horizontally oriented on face 16 and contains in coded form information corresponding to file number information and insert information. File number information includes, for example, the total number of mail pieces being processed, the predetermined printing sequence of the specific mail piece, and the number of pages of the mail piece. Insert information includes, for example, the type and number of inserts to be included in the mail piece upon insertion in a corresponding envelope. Scan code 20 is preferably, but not necessarily, vertically-oriented on tear piece 23 and positioned in close proximity to the recipient's address information 22. Scan code 20 includes file number information.

With the information stored in the data file and communicated to the print file, a document processing method can print the mail pieces based on their corresponding file number sequence and insert them in corresponding envelopes with the appropriate inserts. Mail piece 10 is shown properly inserted in an envelope 24 prior to postage in FIG. 1C. As will be discussed in further detail herein, mail piece 10 is understood to be properly inserted and oriented such that the second scan code 20 is visible along with the recipient's postal address 22 and thus readable through window 26. It is anticipated that various alternative embodiments may be used having differing size and location of windows and perhaps eliminating windows as well. It is anticipated that in such circumstances, scan code 20 may be readable through envelope 24 via a magnetic reader or other suitable device.

Figure 2:
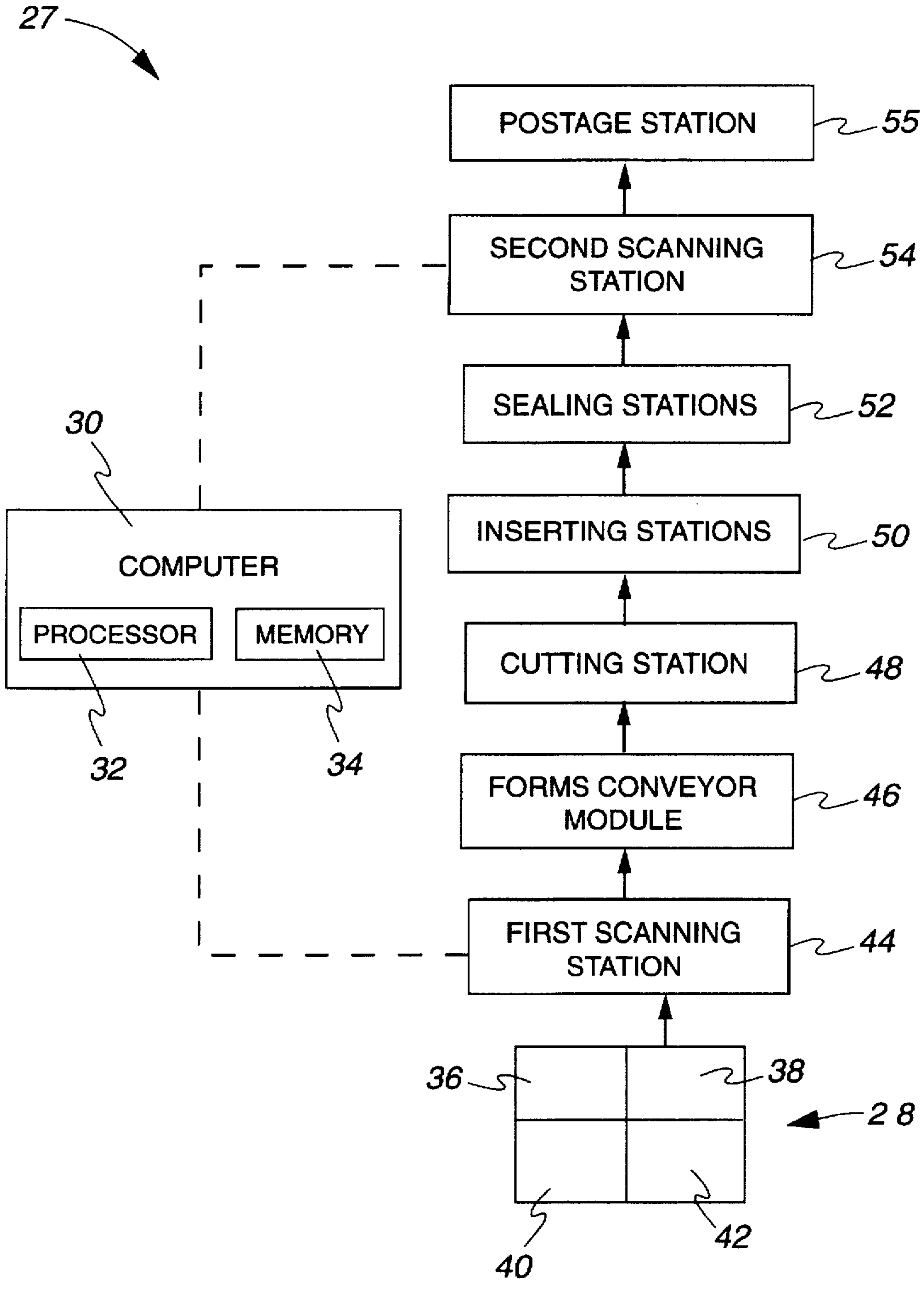
FIG. 2 is a flow diagram of an inserting system used to generate the mail piece of FIG. 1.

Turning now to FIG. 2 of the drawings, there is shown a modular in-line processing system for generating mail piece 10 in accordance with the teachings of the present invention. The modular system is designated generally by reference numeral 27 and includes a forms conveyor module 46 which is provided in electromagnetic communication with a computer 30 having a processor 32 and memory 34.

In operation, a printed document preferably, but not necessarily, in the form of a dual column single roll 28 is fed from a printing station, not shown, to a first scanning station 44. In the example shown, each of the sections 36, 38, 40 and 42 of document 28 comprise a single page of a mail piece which will be separated down line by a cutter, at the cutting station 48.

In keeping with the invention, the first scan code 18 of each of the printed documents is read at a first scanning station 44. As indicated above, first scan code 18 includes file number information and insert information. Scan code 44 thus generates an electrical signal for receipt by down-line inserting stations which are designated generally by reference numeral 50 corresponding to the number and type of inserts to be included with the corresponding mail piece.

The first scanning station is preferably positioned before the location of the forms conveyor 46. In this location, the first scanner can obtain the information governing the contents and sequencing of the mail piece at a stage sufficiently early to ensure that any subsequent mail processing errors will be detected. The printed papers are transmitted to forms conveyor 46 which separates the papers via a cutting process into individual mail pieces.

Following the cutter station 48, each mail piece is forwarded through the above-referenced inserting stations 50 which provide individual inserts to be included therewith. Thereafter, each mail piece is sealed in a sealing station 52 whereupon it is forwarded to a second scanning station 54. At this station, the second scanning code 20 is attempted to be read. If the mail piece is scanned and its appropriate inserts are properly inserted and oriented within envelope 24, a reading will be possible and a corresponding electrical signal will be forwarded to computer 30 and the mail piece will be forwarded to a postage station 55 where the mail piece will be processed for postage. Second scanning station 54 functions as a last check to confirm that the mail sequencing is correct and alternatively, that no mail pieces have been improperly diverted during the inserting process. The second scanning station 54 is thus preferably positioned after the sealing station. As a result of the dual scanners, there is total error recognition within the mail handling process such that every mail piece is recorded, either as posted or as an error requiring a reprint.

It should be noted that in keeping with the invention, several diversion points are built into the inserting system. Throughout the system there are time-sequenced sensors to detect jams, sequencing errors and the like. If a mail piece is diverted at any one of the diversion points, a corresponding error signal is transmitted to processor 32 of computer 30 which identifies the diverted mail piece. This information is stored in memory 34 in the form of a reprint file. At each of these stations, if a mail piece jams, falls out of sequence, has an incorrect number of inserts or postal address which cannot be read through the envelope, then the mail piece is diverted from the inserting system and a corresponding error message is forwarded to the processor 32. Similarly, if a mail piece is damaged or too many inserts are included in its corresponding envelope, an error message is also created and the mail piece is diverted along with the generation of a corresponding error signal.

The second scanning station 54 will also automatically divert the mail piece if the second scanning code 20 is either unreadable or, if as determined by the coded file number information, it has been received in an improper sequence. For example, if file number 20 has been received after file number 16 and the processor has no record of diverting files 17–19, a sequencing error message will be generated for receipt by processor 32 to the effect that files 17–20 need to be reprinted. This information will thereafter be provided to the above-referenced reprint file. Similarly, if the second scanning code is not readable, which in turn means that the postal address cannot be read, an orientation error message will be generated for receipt by processor 32.

The use of dual scan codes at opposite ends of the inserting machine, in conjunction with an automated re-print file, in effect closes the mail handling loop. In accordance with the invention, the files that are diverted are automatically registered in a reprint file (not shown) which is stored in computer memory 34. The re-print file keeps a record of all mail pieces for which an error message has been recorded. The data files corresponding to the diverted mail pieces are then reconfigured so that a new file number is assigned for each of the diverted mail pieces. Accordingly, the print file specifies a new predetermined order for this reconfiguration.

The method of the present invention may be more readily understood by reference to the flow diagram of FIG. 3. As discussed above, in operation, each mail piece is generated 56 in a predetermined order set forth in a print file. Thereafter, each mail piece is received 58 at a first scanning station. A first scanning code is scanned 60 at the scanning station whereupon the mail piece is received 62 at an insert station. Thereafter, the appropriate inserts are inserted 64 in an envelope with each mail piece. The mail piece is then scanned 66 at a second scanning station. It is determined 68 whether the scan code and thus the mailing address are readable. If so, it is then determined 70 if the mail piece is in the proper sequence. If the answer to both of these inquiries is yes, the mail piece is forwarded 72 to a postage station. If the scan code is not readable, or, in the alternative, if the scan code is readable, but it is determined that it has not been received in the proper sequence, the mail is diverted 74 and an appropriate error message, i.e. an orientation error message is generated and received by processor 32. The print file is thereafter reconfigured 76 in the form a reprint file identifying all corresponding files of the mail pieces which have been diverted, lost or for whatever other reason, flagged as having not been printed properly.

The above steps are repeated until every mail piece in the print file has been generated and posted. As a result, when the first and second scan codes are scanned, a new file number is transmitted for each of the reconfigured files.

With the above-described method, all manual intervention is removed. In the preferred embodiment, re-print files are automatically created and executed to print the corresponding mail pieces. Alternatively, the re-print files may be automatically created, yet permit supervisory control by an operator to direct the actual re-printing of designated mail pieces in the re-print file. This embodiment may be utilized, for example, when the number of re-prints is nominal and the operator desires to manually print the corresponding mail pieces and insert them into envelopes prior to postage.

With the invention discussed herein, there is thus disclosed a method which provides a means for recording and determining whether a sequence of mail pieces are properly processed for mailing.

While the best modes for carrying out the invention has been described in detail, those familiar with the art to which this invention relates will recognize various alternative designs and embodiments for practicing the invention as defined by the following claims.

What is claimed is:

1. For use with a computer having a processor and memory, a method of generating a plurality of mail pieces in a predetermined order as specified in a print file, each mail piece corresponding to a data file stored in the computer memory, each data file having an identification field, including file number information identifying the file number, and an insert field, including insert information identifying the inserts to be included with the mail piece in an envelope, the method comprising:

a) generating each of the plurality of mail pieces in the order specified in the print file, each mail piece having a first scan code positioned at a first location on the mail piece and a second scan code positioned at a second location of the mail piece so that it is readable only when the mail piece is properly inserted in its envelope, the first scan code containing its file number information and insert information and the second scan code, containing its file number information;

b) receiving each mail piece at a first scanning station;

c) scanning the first scan code of each mail piece at the first scanning station to identify its corresponding file number and associated inserts;

d) receiving each mail piece at an insert station;

e) inserting each mail piece into its envelope with its corresponding inserts at the insert station;

f) scanning the second scan code of each mail piece at a second scanning station;

g) diverting the corresponding mail piece and transmitting an orientation error message to the processor in response to the second scan code not being readable, the error message identifying the file number of the diverted mail piece;

h) determining if the mail piece was received at the second scanning station in the proper sequence;

i) forwarding the mail piece to a postage station in response to the second scanning station receiving the mail piece in the proper sequence;

j) diverting the mail piece and generating a sequence error message for receipt by the processor in response to the second scanning station not receiving the mail piece in the proper sequence;

k) reconfiguring the print file to comprise only the corresponding data files of the diverted mail pieces, the reconfigured print file specifying a predetermined order for printing the mail pieces;

l) repeating steps (a)–(k) until all mail pieces in the print file have been generated.

2. The method of claim 1 wherein the first scan code is a bar code.

3. The method of claim 1 wherein the second scan code is a bar code.

* * * * *